(12) United States Patent
Reed et al.

(10) Patent No.: US 8,233,675 B2
(45) Date of Patent: Jul. 31, 2012

(54) IMAGE, VIDEO OR AUDIO FILTERING BEFORE BIOMETRIC RECOGNITION

(75) Inventors: Alastair M. Reed, Lake Oswego, OR (US); Brett A. Bradley, Portland, OR (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 1187 days.

(21) Appl. No.: 11/765,987

(22) Filed: Jun. 20, 2007

(65) Prior Publication Data
US 2008/0013801 A1    Jan. 17, 2008

Related U.S. Application Data

(60) Provisional application No. 60/815,504, filed on Jun. 20, 2006.

(51) Int. Cl.
*G06K 9/00* (2006.01)
(52) U.S. Cl. ......... 382/118; 382/162; 382/163; 713/186
(58) Field of Classification Search .................. 382/115, 382/118, 162, 163; 713/186
See application file for complete search history.

(56) References Cited

U.S. PATENT DOCUMENTS

| | | | | |
|---|---|---|---|---|
| 5,937,103 A * | 8/1999 | Oh et al. | ........................ | 382/276 |
| 6,333,990 B1 * | 12/2001 | Yazici et al. | .................. | 382/132 |
| 6,394,356 B1 * | 5/2002 | Zagami | ......................... | 235/487 |
| 2004/0213437 A1 * | 10/2004 | Howard et al. | ............... | 382/115 |
| 2005/0031173 A1 * | 2/2005 | Hwang | ......................... | 382/118 |

* cited by examiner

*Primary Examiner* — Chan S Park
*Assistant Examiner* — Eueng-Nan Yeh
(74) *Attorney, Agent, or Firm* — Mintz, Levin, Cohn, Ferris, Glovsky and Popeo, P.C.

(57) ABSTRACT

The present invention relates generally to pre-processing images, audio and/or video to improve biometric analysis from such. In one implementation, a method is provided including: receiving a color digital image including a representation of a human subject; converting the color digital image into grayscale values; transforming at least one representation of the converted color image; analyzing the transformed, converted color image to identify artifacts; if artifacts are found, processing the color digital image to reduce the artifacts; and providing the processed digital image to a biometric system. Other implementations are provided as well.

10 Claims, 5 Drawing Sheets

IMAGE, VIDEO OR AUDIO FILTERING BEFORE BIOMETRIC RECOGNITION

RELATED APPLICATION DATA

This application claims the benefit of U.S. Provisional Patent Application No. 60/815,504, filed Jun. 20, 2006, which is hereby incorporated by reference.

TECHNICAL FIELD

The present invention relates generally to pre-processing images, video and/or audio to improve biometric analysis of the images, video and/or audio.

BACKGROUND AND SUMMARY

The present invention provides ways to improve biometric analysis of audio, video and images. Some aspects of the invention help to reduce so-called "false positives." False positives can occur, e.g., when a biometric system erroneous matches one biometric sample to another.

By way of background, some facial recognition systems are provided by commercial manufacturers, e.g., such as Identix Corp. of Minnetonka, Minn. (e.g., their IDENTIX FACE IT product) and Cognitec Systems GmbH with a U.S. Office in Herndon, Va. (e.g., their FaceVACS product). Such biometric recognition systems can be adapted to compare two images. For example, such systems may be used to compare two facial images to determine whether the two images belong to the same person. Other commercial products are available that can compare two fingerprint images and determine whether the two images belong to the same person. For example, U.S. Pat. Nos. 6,185,316; 6,111,517; 6,072,894; 5,991,429; 5,450,504 and 5,224,173, further describe various types of biometrics systems, including facial recognition systems and fingerprint recognition systems, and these patents are hereby incorporated by reference.

Further aspects, implementations, features and advantages will become even more apparent with reference to the following detailed description and accompanying drawings.

BRIEF DESCRIPTION OF THE DRAWINGS

(All magnitude values are normalized in FIGS. 3, 4, 5, 8 and 10.)

DETAILED DESCRIPTION

Facial recognition and other biometric templates can be used to help prevent fraud or duplication during image enrollment, document issuance and/or identity verification. For example, consider a fraud scenario where a fraudster—we will call him Jake to personalize the example—obtains a first driver's license under a first name (Jake) and then later returns to the Department of Motor Vehicles (DMV) to obtain a second driver's license under a second, different name (e.g., Chuck). Jake has forged or otherwise obtained supporting documents (e.g., a birth certificate for the Chuck alias, power bill, etc.) needed for the second driver's license.

(It is time consuming and expensive to apprehend and prosecute those responsible for identity theft and identity fraud. Thus, to help reduce identity theft and identity fraud, it may be advisable for issuers of identity-bearing documents to take affirmative preventative steps at the time of issuance of the identity documents. Because of the large number of documents that are issued every day and the large history of already issued documents, however, it is difficult for individual employees of the issuers to conduct effective searches at the time such documents are issued (or re-issued). In addition, the complexity and amount of the information stored often precludes manual searching, at least as a starting point.

And many government and business organizations, such as DMVs store large databases of information about individuals. A DMV database record may include information such as an operator's name, address, birth date, height, weight, and the like. Some motor vehicle registry databases also include images of the operator, such as a facial image and/or a fingerprint image. Unless the database is fairly small, it is very difficult for it to be manually searched in an effective manner.)

Facial recognition or other biometric systems can be used to determine whether an applicant's biometric (e.g., Chuck's photograph from the example above) match any other biometrics in the database (e.g., Jake's photograph from the example above). For example, when a digital image is enrolled in an identity document issuance system (e.g., a DMV database, passport issuing authority database, or more generally, an image database), a facial recognition system can be used to compare the digital image of the person being enrolled to a database of digital images representing people who are already enrolled or to whom documents have already been issued to. One goal of this comparison is to avoid issuing a new identity document to a person (e.g., Chuck) who is already enrolled (e.g., as Jake). The present assignee discusses some related problems and solutions in application Ser. No. 10/723,240, filed Nov. 26, 2003 (published as US 2004-0213437 A1 and hereby incorporated by reference). The Ser. No. 10/723,240 application claims the benefit of U.S. Provisional Application No. 60/429,501, filed Nov. 26, 2002, hereby incorporated by reference.

Some face recognition applications use a camera to capture one or more successive images of a subject, locate the subject's face in each image, and match the subject's face to a one or more faces stored in a database of stored images. In some face recognition applications, the facial images in the database of stored images are stored as processed entities called templates. A template represents the processing of an image (e.g., a facial image) to a predetermined format, e.g., a machine readable format. Storing, encoding or otherwise formatting the image as a template helps enable automated comparison between images. For example, in a given application, a camera can capture the image of a given subject, perform processing to convert the image to a template, then compare the template of the given subject to one or more templates stored in a database, to determine if the template of the subject can be matched to one or more stored templates.

Facial recognition has been deployed for applications such as surveillance and identity verification. In surveillance, for example, a given facial recognition system may be used to capture multiple images of a subject, create one or more templates based on these captured images, and compare the templates to a relatively limited "watch list" (e.g., set of stored templates), to determine if the subject's template matches any of the stored templates. In surveillance systems, outside human intervention may be needed at the time of enrolling the initial image for storage in the database, to evaluate each subject's image as it is captured and to assist the image capture process. Outside human intervention also may be needed during surveillance if a "match" is found between the template of a subject being screened and one or more of the stored templates.

Returning to the above fraud scenario (e.g., Jake obtaining another ID document using the Chuck alias), we have found that poor or diminished image quality can adversely affect comparison of a digital image to a database of images (or a biometric template derived from such poor quality images to other biometric templates). Some captured images (e.g., captured by video cameras or PC-based cameras) may include unwanted artifacts, e.g., wavy horizontal or vertical lines, due to camera optics, and/or camera and/or computer electronics or interference, etc. Other artifacts may include grainy or blurry features, visible compression blocks, etc.

Figure 1:
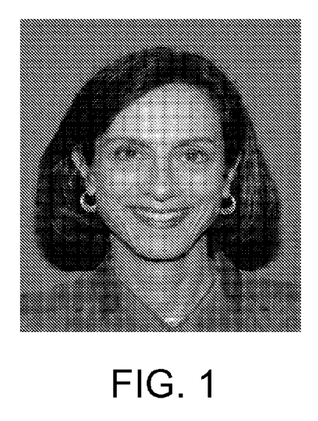
FIG. 1 illustrates an example problem image.

Erroneous biometric matches can be obtained between images that contain similar—but unwanted—artifacts. For example, an erroneous facial recognition match (a "false positive") might result when comparing the image shown in FIG. 1 to one or more different images depicting different persons. The false positive results, e.g., since images each have similar—but unwanted—image artifacts (e.g., similar regular spatial frequency in the form of horizontal lines, as exemplified in FIG. 1). The artifacts can be introduced by image capture problems or subsequent signal processing, e.g., JPEG compression.

We provide solutions to identity and correct (if possible) a problem image. We use the phrase "problem image" in this document to include, e.g., an image that can be susceptible to yielding a false positive biometric match with other problem images due to, e.g., unwanted image artifacts. More generally, a problem image includes unwanted artifacts.

At image capture (e.g., at a DMV image capture station)—and prior to accepting an image into an image database—it would be preferably to analyze a captured image to determine whether the image is a problem image, e.g., whether it includes unwanted artifacts. And while the following discussion is generally directed to detecting regular spatial frequencies—in the horizontal and/or vertical directions—the present invention is not so limited. Other unwanted artifacts can be similarly detected and corresponding corrections made.

Figure 2A:
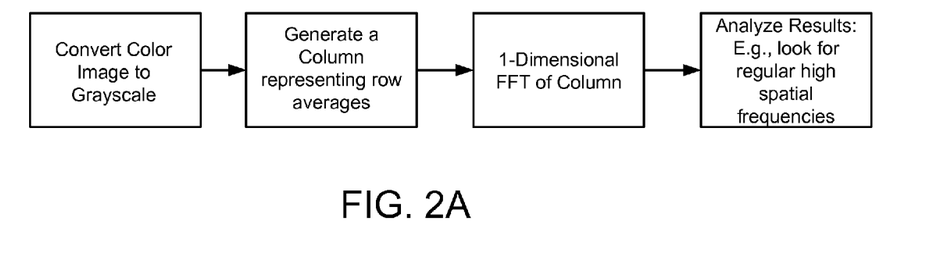
FIG. 2A is a flow diagram illustrating detection of a problem image.
Figure 2B:
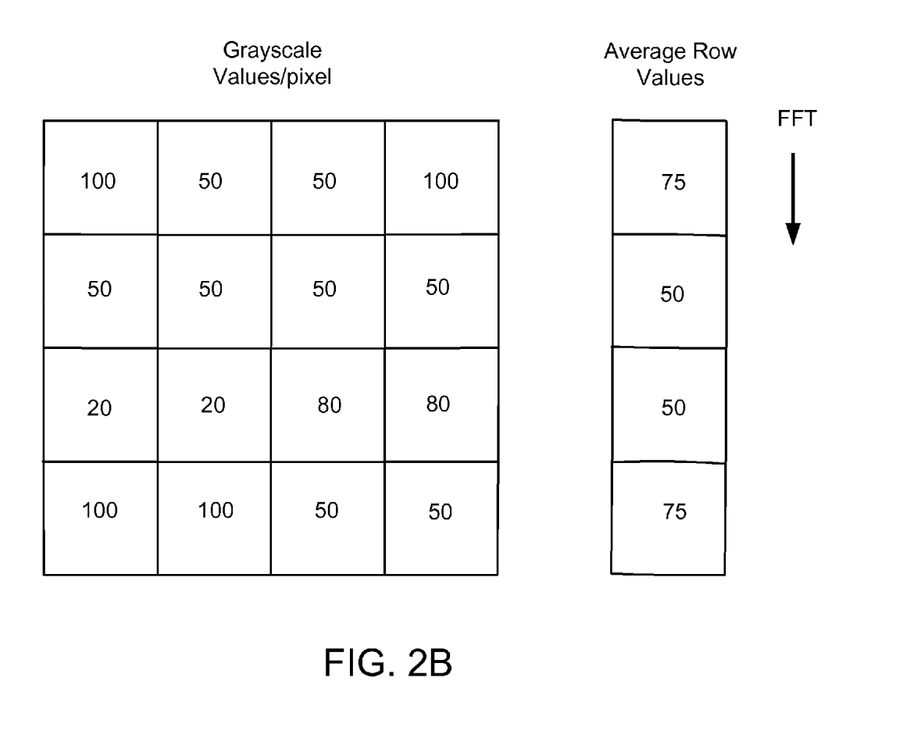
FIG. 2B illustrates averaging used in detection in one implementation of the invention.

Analysis of a Captured Image (FIG. 2A):
  Convert a captured digital color image to grayscale. (As will be appreciated grayscale is an image representation in which each pixel is represented by a single sample value representing overall luminance of the pixel, e.g., on a scale from black to white).
  Average image rows. A simplified example is shown in FIG. 2B, with grayscale pixel values for each of the rows being averaged. Averaging the rows helps to minimize image content, since we are looking for noise or regular frequency patterns.
  A one-dimensional transform, e.g., a Fast Fourier Transform (FFT), is carried out for a column including the averaged grayscale values (FIG. 2B). This helps to suppress values near the DC frequency.
  Analyze the results. For example, the results can be plotted (e.g., FIGS. 3 and 4) to identify any regular high spatial frequencies.

In an alternative implementation a detector is provided to recognize or detect a problem image, e.g., an image including unwanted artifacts. For example, a detection module identifies which type of artifact is present, e.g., regular spatial frequencies, compression artifacts, blurring, etc. This determination can use, e.g., predetermined criteria like a predetermined frequency response, peaks in unexpected frequencies, etc. Then based on a particular identified type of problem, the unwanted artifacts are removed using a predetermined filter that is designed to address a particular identified type of unwanted artifact. For example, phase information is determined (e.g., is phase random or positioned at regular locations) and then used to identify a particular type of filter.

Figure 3:
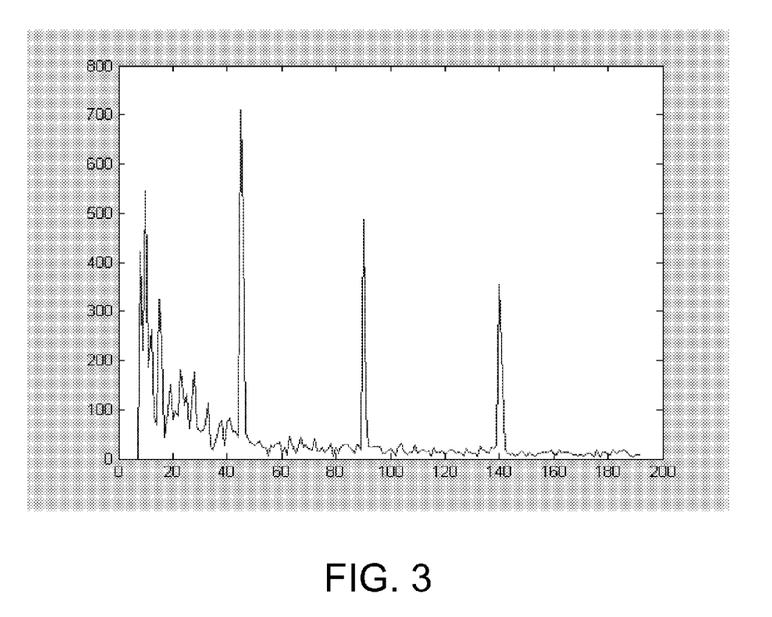
FIG. 3 is a plot of a spatial frequency distribution of a problem image.

FIG. 3 illustrates a problem image with a spatial frequency distribution plot. Spikes in the spatial frequency as shown in FIG. 3 may indicate a presence of a regular unwanted noise pattern (e.g., an unwanted artifact). And—more generally—for other problem images a large overall magnitude of high spatial frequencies may indicate unwanted noise.

Figure 4:
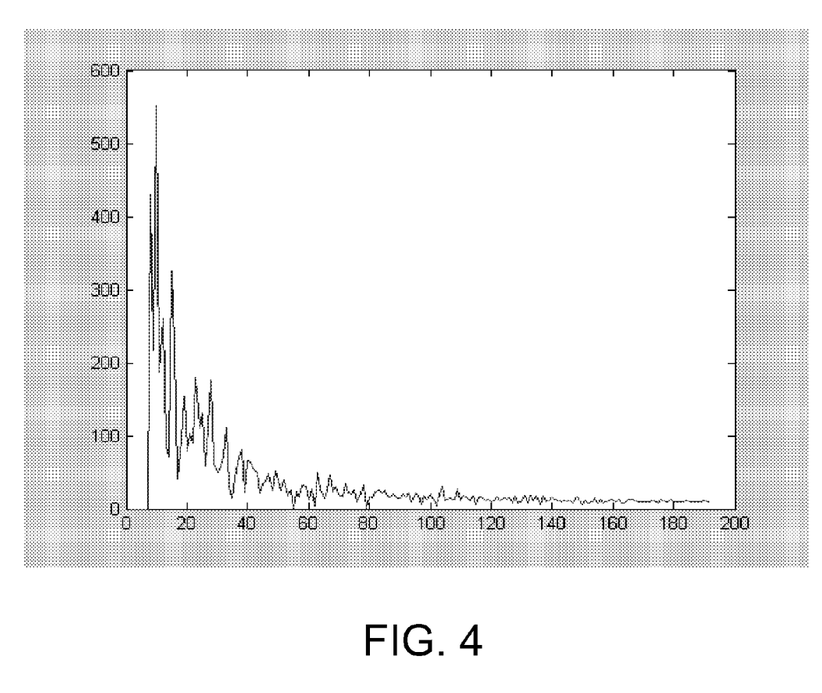
FIG. 4 is a plot of a spatial frequency distribution of a good image.

Identification of unwanted noise can be based, e.g., on a determination that real image content of human subjects generally includes monotonically decreasing spatial frequencies, e.g., as shown in FIG. 4. Spatial frequencies in an area where a normal or good image would be expected to decrease, e.g., above a frequency in the range of 30-60, are examined to determine whether they exceed a predetermined threshold value (e.g., a normalized magnitude of 200 or other predetermined magnitude). If any unexpected high-magnitude spatial frequencies (e.g., as in FIG. 3) are detected then the image (e.g., FIG. 1) is preferably processed to remove the unwanted spatial frequencies. More generally, we can examine spatial frequencies above a certain frequency (e.g., above a frequency in the range of 15-60) and look for any frequencies that might be suspect or suspicious due to unexpected peaks or generally high magnitude. For example, with reference to FIG. 3, we see unexpected high magnitude frequencies close to 50, 90 and 140—which are unexpected for a normal image of a human subject.

If possible, an image is recapture—prior to storage of the image in an image database or printing the image on an identification document—if an original captured image is identified as a problem image.

Or, if problem images have been previously stored in a database, we can use the above detection analysis to determine whether we should correct for unwanted artifacts prior to biometric matching or analysis.

In an alternative implementation a digital image is separated into its color components (e.g., red, green and blue). Each color plane is individually analyzed. For example, and for the red color component, red color values in rows are averaged in the manner discussed above with respect to FIG. 2B. A transform, e.g., a Fast Fourier Transform (FFT), is carried out for a column including the averaged red color values. The results can be plotted to identify any regular high spatial frequencies. A similar process is repeated for the green and blue components. Each spatial frequency distribution (e.g., one for red, green and blue) is analyzed to determine whether processing is warranted per each distribution. If so, those color channels warranting processing are processing as discussed below. (For example, a distribution might show that only red and green (but not blue) have unwanted artifacts. Processing—perhaps different processing for each component—is then carried out for the red and green components.

Processing Problem Images

We can process problem images to reduce artifacts in hope, e.g., of improving biometric analysis.

For example, if an image includes unwanted noise at a regular spatial frequency one type of filtering (e.g., a notch filter) can be performed to selectively remove the unwanted frequencies. If the noise is of a more random nature then a more generalized noise removal filter can be used.

Figure 5:
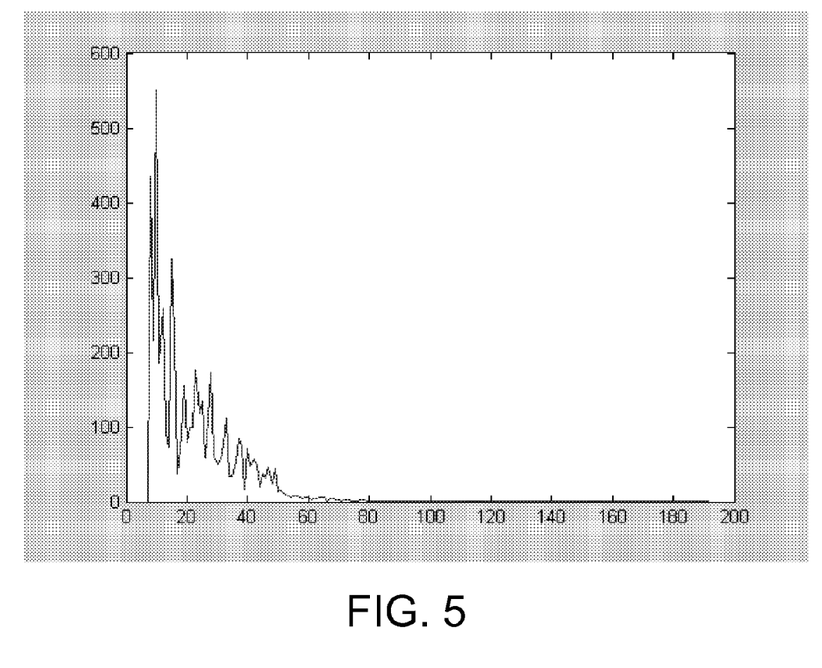
FIG. 5 is a plot of a spatial frequency distribution of the FIG. 3 problem image after processing according to one aspect of the present invention.
Figure 6:
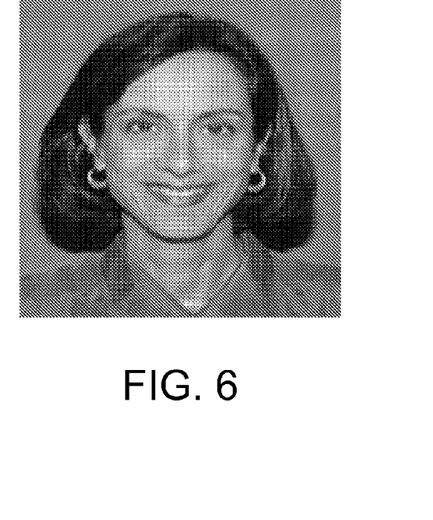
FIG. 6 illustrates an example problem image after horizontal line filtering.

A first processing approach takes a position that most or all of the higher spatial frequencies in the image above about 45 (or more generally above a frequency in a range of 30-60) are likely to be either image artifacts or noise. Thus the spatial frequencies above 45 in this approach are set to zero (FIG. 5). A corresponding low-pass filter is preferably applied on a per column basis for each color channel of the image. Of course, filtering can either be performed in a frequency domain or in the spatial domain. (Filtering in the spatial domain may be preferred for efficiency reasons and to improve visual image quality.) A resulting image after application of a low pass frequency filter to the FIG. 1 image is shown in FIG. 6.

Figure 7:
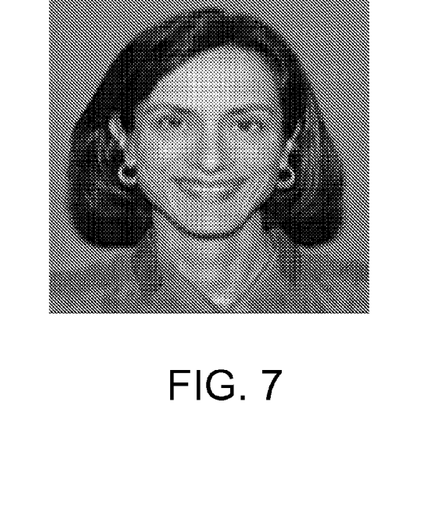
FIG. 7 illustrates an example problem image after a spatial domain horizontal line filtering.
Figure 8:
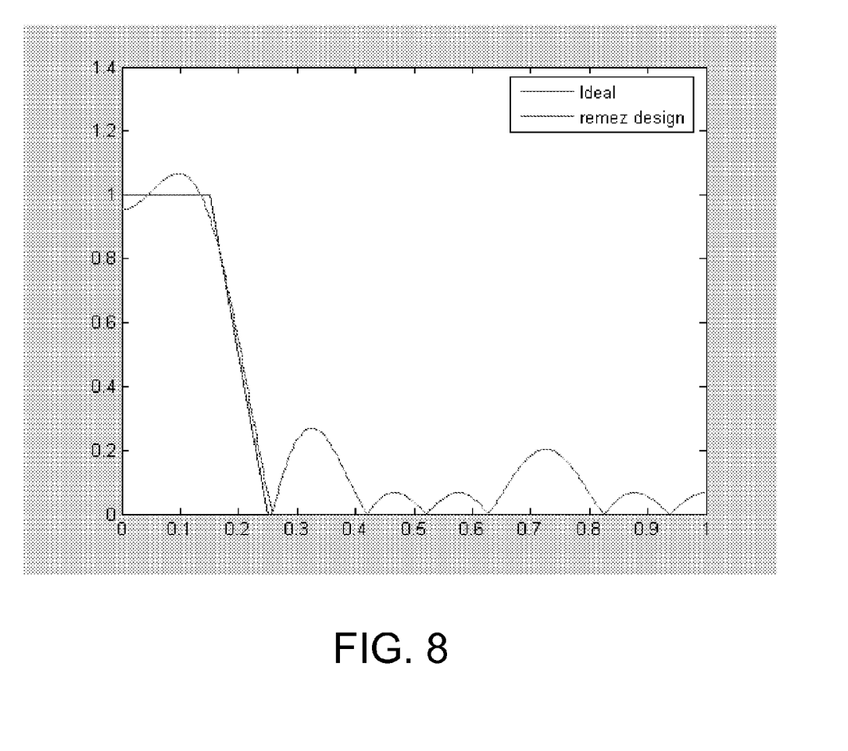
FIG. 8 is a plot of a smooth 15 tap filter design for the image shown in FIG. 7.

A second processing approach improves image quality by providing a spatial domain filter with a limited number of taps to reduce the spatial extent of possible ringing (or blurring). A spatial domain filter is designed to accomplish a frequency filtering operation with a minimum number of taps to reduce computation and avoid objectionable ringing on high contrast edges. Such a filter would also be more efficient to implement relative to a frequency domain filter. FIG. 8 is a smooth 15 tap filter and FIG. 7 shows results of the FIG. 8 filter as applied to the FIG. 1 image.

Figure 9:
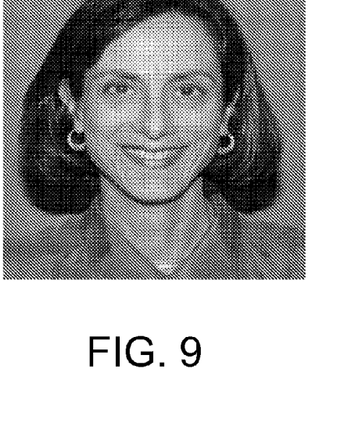
FIG. 9 illustrates an example of an image filtered with a horizontal line band pass filter.
Figure 10:
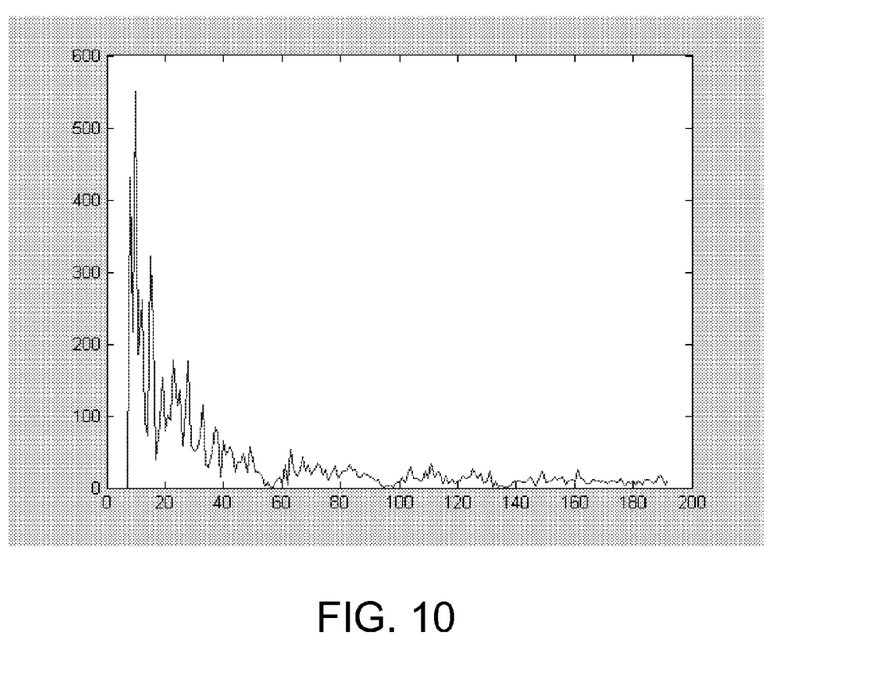
FIG. 10 is a plot of a spatial frequency distribution of a problem image after filtering.

A third approach—and an alternative to low pass filtering an image to remove the unwanted horizontal line artifacts—is to notch out spatial frequencies which correspond to the horizontal lines (e.g., a band pass filter). This type of filter will preserve more of the high spatial frequencies and result in a subjectively sharper image. A plot of a frequency distribution after such a band pass filter is applied to the FIG. 1 (corresponding to a frequency distribution plotted in FIG. 3) is shown in FIG. 10. FIG. 9 shows the results of a band pass filter as applied to FIG. 1 image.

We note that in the FIG. 10 example many of the higher spatial frequencies that are preserved after band pass filtering do not appear to represent real image content since most of the high frequency content appears to be low level image artifacts. Nevertheless, with higher quality original images, this band pass (or multiple-notch) filter approach might be even more meaningful. To implement, the location of the regular spatial frequencies are found as note above and a spatial filter can be provided to remove them. This approach can also be applicable to remove known artifacts like a 8*8 JPEG blocking artifact.

(We also note that even better image quality—after filtering—can be achieved if locations of regular spatial frequencies are found, and a spatial filter is then designed to remove the artifacts only at those spatial locations. This would be relatively straightforward for a known artifact like 8*8 JPEG compression blocking artifacts. Once again this filter could be implemented in the spatial domain to reduce ringing on sharp edges and to minimize the computation required.)

Besides the approaches noted above a few other techniques can be used such as an adaptive filter or a median filter. Of course, any of the above filters can be adapted according to characteristics of a biometric system (e.g., facial recognition software) that an image is being delivered to. For example, if a facial recognition system is susceptible (e.g., may yield false positives) to unwanted horizontal and/or vertical lines then a filter can be designed to address this type of artifact. Or if another system is susceptible to compression artifacts then a filtering process is designed to target and minimize the compression artifacts.

In the context of images stored in a database, an unprocessed image is preferably (but not required to be) stored and is not replaced in the database with processed version, as different biometric systems may require different image characteristics.

We also note that our analysis and processing techniques can enhance digital watermarking of images, since the above processing operations should also reduce interference with a watermark due to image content or unwanted artifacts.

Digital watermarking—a form of steganography—is a process for modifying media content to embed a machine-readable code into the content. The content may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including text documents (e.g., through line, word or character shifting, background texturing, etc.), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other domain (e.g., Fourier, Discrete Cosine or Wavelet transform domains). The reading component analyzes target content to detect whether a watermark is present. In applications where the watermark encodes information (e.g., a plural-bit message), the reader extracts this information from the detected watermark.

The present assignee's work in steganography, data hiding and digital watermarking is reflected, e.g., in U.S. Pat. Nos. 5,862,260, 6,408,082, 6,614,914, 6,947,571; and in published specifications WO 9953428 and WO 0007356 (corresponding to U.S. Pat. Nos. 6,449,377 and 6,345,104). A great many other approaches are familiar to those skilled in the art. The artisan is presumed to be familiar with the full range of literature concerning steganography, data hiding and digital watermarking. Each of the above patent documents is hereby incorporated by reference.

While we have focused on imagery (including video) we note that some biometric systems analyze voice and audible signals. A similar detection and processing technique can be applied to such signals. For example, we can analyze an audible signal to see if any unexpected or regular acoustic frequencies are present. If so, a filter can be applied to the signal to reduce the impact of these frequencies prior to biometric analysis.

And we expect that our techniques will help reduce errors associated with, e.g., human fingerprint images that include unwanted image artifacts.

We also note that processing an image to improve performance of a biometric recognition system could also help improve image quality to allow improved visual confirmation by a human operator.

And, as we mentioned above, identification of unwanted noise can be based on a determination that real image content of human subjects generally includes monotonically decreasing spatial frequencies, e.g., as shown in FIG. 4. For example, spatial frequencies in an area where a normal or good image would be expected to decrease, e.g., in a frequency range of 40-60, are examined to determine whether they exceed a predetermined threshold value (e.g., a normalized magnitude of 200 or other predetermined magnitude). Thus, since images should fall off monotonically, another detection method looks for the reverse of this monotonically fall off or looks for unexpected spikes in contrast to an expected fall off (e.g., as shown in FIG. 4).

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporates by reference each of the U.S. patent documents referenced above.

The methods, processes, components, modules, generators and systems described above may be implemented in hardware, software or a combination of hardware and software. For example, the signal processing, filtering, detection and/or watermarking processes may be implemented in a programmable computer or a special purpose digital circuit. Similarly, signal processing, filtering, detection and/or watermarking processes may be implemented in software, firmware, hardware, or combinations of software, firmware and hardware.

The methods, components and processes described above may be implemented in software programs (e.g., C, C++, Visual Basic, Java, executable binary files, etc.) executed from a system's memory (e.g., a computer readable medium, such as an electronic, optical or magnetic storage device).

Our techniques will also apply to video imagery as well.

The particular combinations of elements and features in the above-detailed embodiments are exemplary only; the interchanging and substitution of these teachings with other teachings in this and the incorporated-by-reference U.S. patent documents are also contemplated.

What is claimed is:

1. A method of processing images to improve biometric analysis in providing an identification document comprising:
   receiving a color digital image including a photographic representation of a human subject, wherein the digital image is intended to be placed on an identification document and a copy of the digital image is stored in a database;
   converting the color digital image into grayscale values;
   transforming at least one representation of the converted color image;
   analyzing the converted transformed color digital image to determine whether it is suitable for biometric assessment by identifying artifacts in the converted transformed color digital image;
   processing the color digital image to reduce artifacts therein when the act of analyzing determines that the presence of identified artifacts in the color digital image based on the converted transformed color digital image is not suitable for biometric assessment;
   wherein the act of processing comprises filtering using one of a low-pass filter and a band pass filter;
   searching the database to determine whether the processed color digital image statistically matches one or more images in the database based on at least one biometric assessment;
   and when no statistical match is found, providing the processed color digital image for storage in the database and the processed color digital image for inclusion on an identification document.

2. The method of claim 1 wherein the artifacts comprise noise.

3. The method of claim 1 wherein the artifacts are manifested in a transform domain as at least one regular spatial frequency.

4. The method of claim 3 wherein the representation comprises a column including rows each representing a grayscale average of the converted image.

5. The method of claim 4 wherein the act of transforming comprises a Fast Fourier Transform (FFT).

6. The method of claim 5 wherein the biometric system comprises a facial recognition system.

7. The method of claim 1 wherein a determination of suitability for biometric assessment is based on a predetermined acceptable level of image noise.

8. The method of claim 7 wherein the image noise comprises at least one regular spatial frequency.

9. The method of claim 1 wherein the biometric assessment comprises facial recognition.

10. The method of claim 1 wherein prior to inclusion on or in the identification document encoding the processed color digital image with a digital watermark.

* * * * *

UNITED STATES PATENT AND TRADEMARK OFFICE
CERTIFICATE OF CORRECTION

| | | |
|---|---|---|
| PATENT NO. | : 8,233,675 B2 | Page 1 of 1 |
| APPLICATION NO. | : 11/765987 | |
| DATED | : July 31, 2012 | |
| INVENTOR(S) | : Reed et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this
First Day of January, 2013

David J. Kappos
*Director of the United States Patent and Trademark Office*